United States Patent
Lammers (10) Patent No.: US 6,866,062 B2
(45) Date of Patent: Mar. 15, 2005

(54) CHECK VALVE

(75) Inventor: Daniel A. Lammers, Florissant, MO (US)

(73) Assignee: Control Devices, Incorporated, St. Louis, MO (US)

( * ) Notice: Subject to any disclaimer, the term of this patent is extended or adjusted under 35 U.S.C. 154(b) by 53 days.

(21) Appl. No.: 10/238,179

(22) Filed: Sep. 10, 2002

(65) Prior Publication Data

US 2004/0045607 A1 Mar. 11, 2004

(51) Int. Cl.$^7$ .............................................. F16K 15/06
(52) U.S. Cl. .................. 137/543; 137/513.7; 137/542; 251/337
(58) Field of Search .......................... 137/513.7, 515.5, 137/542, 543, 543.13, 533.21; 251/337, 368

(56) References Cited

U.S. PATENT DOCUMENTS

| | | | |
|---|---|---|---|
| 967,514 A | * 8/1910 | Groh | 137/515.5 |
| 2,594,641 A | * 4/1952 | Griffith et al. | 137/543 |
| 2,744,727 A | * 5/1956 | Osburn | 137/454.2 |
| 2,844,164 A | 7/1958 | Robbins | |
| 2,870,784 A | 1/1959 | Walls | |
| 2,909,192 A | * 10/1959 | Dobrick | 137/542 |
| 3,327,992 A | 6/1967 | Billeter et al. | |
| 3,358,705 A | 12/1967 | Krechel | |
| 3,587,619 A | 6/1971 | Krechel | |
| 3,587,632 A | * 6/1971 | Clay | 137/543 |
| 3,685,533 A | 8/1972 | Krechel | |
| 3,756,273 A | * 9/1973 | Hengesbach | 137/540 |
| 3,786,828 A | 1/1974 | Krechel | |
| 3,983,899 A | * 10/1976 | Graham et al. | 137/495 |
| 4,120,319 A | * 10/1978 | Krechel et al. | 137/583 |
| 4,321,940 A | 3/1982 | Krechel et al. | |
| 4,343,456 A | * 8/1982 | Zitzloff | 251/255 |
| 4,368,756 A | 1/1983 | Carlson | |
| 4,535,808 A | 8/1985 | Johanson et al. | |
| 4,612,962 A | * 9/1986 | Purvis | 137/543.17 |
| 4,665,943 A | * 5/1987 | Medvick et al. | 137/543.17 |
| 4,966,182 A | * 10/1990 | Lavelle et al. | 137/1 |
| 4,979,721 A | * 12/1990 | Gilbert | 251/149.6 |
| 4,986,297 A | * 1/1991 | Ross, II | 137/15.18 |
| 5,062,452 A | * 11/1991 | Johnson | 137/533.25 |
| 5,113,900 A | * 5/1992 | Gilbert | 137/515.5 |
| 5,707,309 A | * 1/1998 | Simpson | 474/110 |
| 5,758,682 A | 6/1998 | Cain | |
| 5,967,410 A | * 10/1999 | Lammers | 236/93 R |

* cited by examiner

Primary Examiner—Ramesh Krishnamurthy
(74) Attorney, Agent, or Firm—Senniger Powers (57) ABSTRACT

A check valve for a compressed gas system. The valve has a body with an internal passage extending through the body and a valve seat positioned in the passage. A poppet is movable between a closed position in which the poppet engages the seat to block flow of gas through the passage and an open position in which the poppet is spaced from the seat to permit flow of gas. A retainer mounts the poppet in the passage and guides movement of the poppet. A spring urges the poppet to the closed position such that the poppet is responsive to pressure of the gas exceeding a predetermined value to move the poppet away from the seat against the urging of the biasing member and to the open position.

27 Claims, 9 Drawing Sheets

CHECK VALVE

BACKGROUND OF THE INVENTION

This invention relates to controlling flow of gas in a compressed gas system, and more particularly to a check valve for use in the delivery of air under pressure from an air compressor to a storage tank holding the air under pressure.

Check valves are in widespread use for permitting pressurized gas to flow through a passage in one direction and preventing flow in the reverse direction. Most check valves have a movable poppet which is urged by a spring to engage a valve seat, thereby closing the valve. When force on the poppet due to air pressure exceeds the force of the spring, the poppet moves away from the seat, thereby opening the valve.

One application is at a fitting on the storage tank, where a check valve receives a flow of air from a compressor for delivery to the tank, and then retains air in the tank when the compressor shuts off. That valve is exposed to a severe environment typical for a compressor discharge, including large air pressure fluctuations and turbulent flow. Consequently, the poppet and other parts of the valve are subject to substantial vibrations which can result in noise, damage, and/or failure. Some valves of the prior art include a guide mounted inside the valve for guiding movement of the poppet to prevent damage. Unfortunately, these guides are frequently located at a position within the valve where installation and replacement of a guide is difficult, or they are flexible in construction or otherwise ill-suited for the severe environment. Moreover, some guides or springs have configurations which obstruct a significant portion of the available flow area of the passage, thereby degrading air pressure as it flows through the valve and potentially causing additional vibration or failure.

BRIEF SUMMARY OF THE INVENTION

Among the several objects of one or more embodiments of the invention may be noted the provision of a check valve which is adapted to reliably check escape of compressed air in association with a compressed air tank and air compressor which supplies the tank with compressed air; the provision of such a valve which can withstand the severe compressor discharge environment; the provision of such a valve which is easily assembled; the provision of such a valve which avoids substantial decrease in pressure of the air as it flows through the valve; the provision of such a valve which, in one embodiment, is adapted for relief of air pressure therein when the compressor shuts down; and the provision of such a valve which is of economical construction.

In general, a check valve of the present invention comprises an elongate body having a passage extending therethrough from a first end constituting its end for entry of gas under pressure to flow through to a second end constituting its end for exit of the gas. The passage is formed with a valve seat intermediate its ends spaced from and directed toward the exit end. A retainer is fixed in the passage spaced downstream from the seat apertured for the exit of the gas. The retainer has a rigid construction with a substantially central sleeve extending therefrom toward the seat. A poppet is slidable in the sleeve biased for engagement with the seat for blocking flow through the passage and disengagement from the seat on pressurization above a predetermined value for flow in the space around the sleeve and through the retainer for exit from the passage.

In another aspect, a check valve of the present invention is for a compressed gas system. The valve comprises a valve body adapted for connection to the compressed gas system, the body having opposite ends and an internal passage extending through the body between an entry at a first end of the body and an exit at a second end of the body. A valve seat is positioned between the entry and the exit. A poppet is movable between a closed position in which the poppet engages the seat to block flow of gas through the passage and an open position in which the poppet is spaced from the seat to permit flow of gas. A retainer is for mounting the poppet in the passage and for guiding movement of the poppet between the closed and open positions. A biasing member is for urging the poppet to the closed position such that the poppet is responsive to pressure of the gas exceeding a predetermined value to move the poppet away from the seat against the urging of the biasing member and to the open position. The valve body has an internal shoulder in the passage adjacent the exit end, the retainer being seated on the internal shoulder and held in place by the exit end of the body being crimped over on the retainer.

Other objects and features will be in part apparent and in part pointed out hereinafter.

BRIEF DESCRIPTION OF THE DRAWINGS

Corresponding reference characters indicate corresponding parts throughout the views of the drawings.

DETAILED DESCRIPTION OF PREFERRED EMBODIMENTS

Referring now to the drawings and in particular to FIGS. 1–4, a check valve of this invention, designated 10 in its entirety, is shown to comprise an elongate body 12, a movable poppet 14, a valve retainer 16, and a spring 18.

Figure 1:
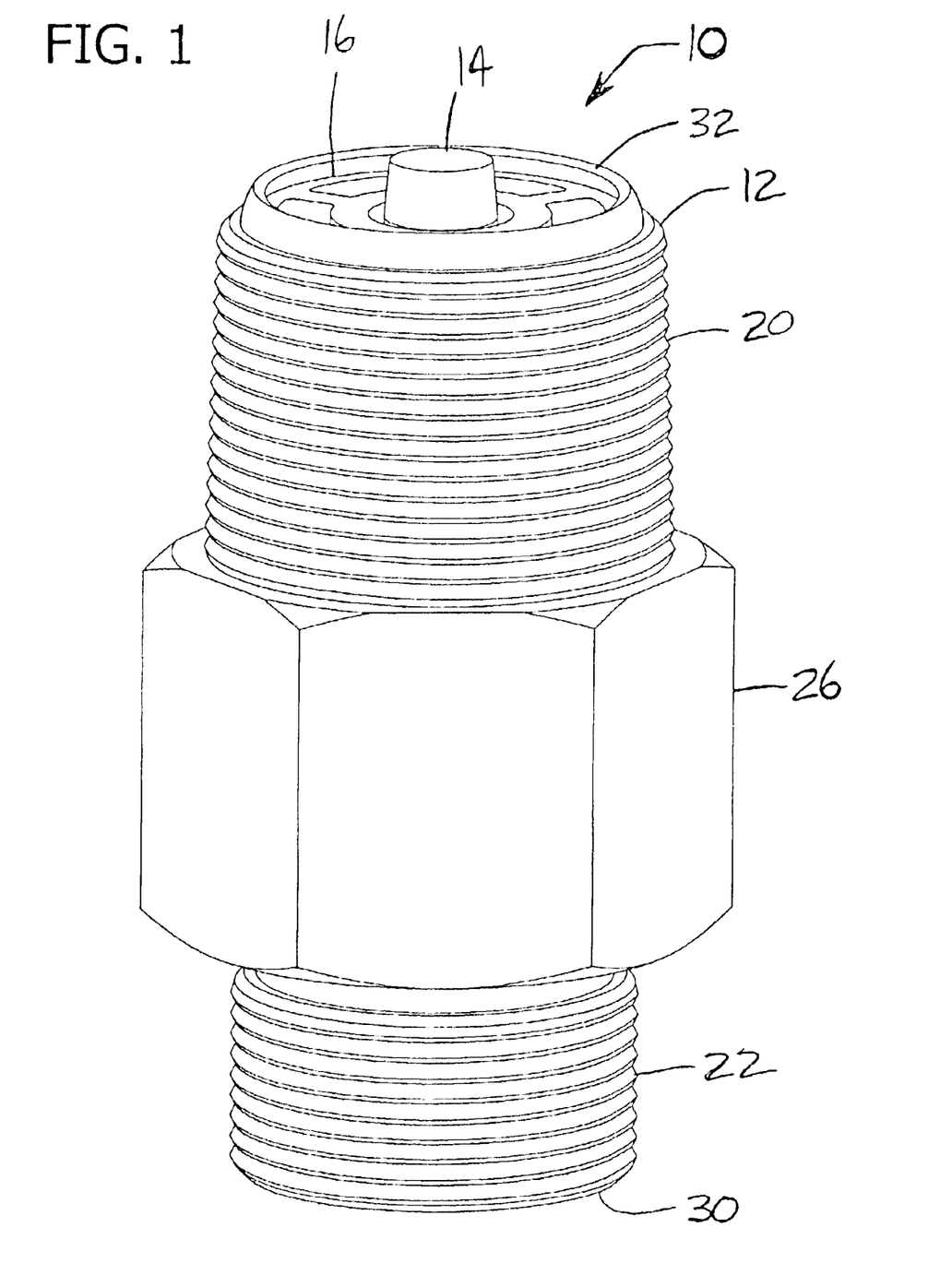
FIG. 1 is a perspective of a check valve of this invention.
Figure 2:
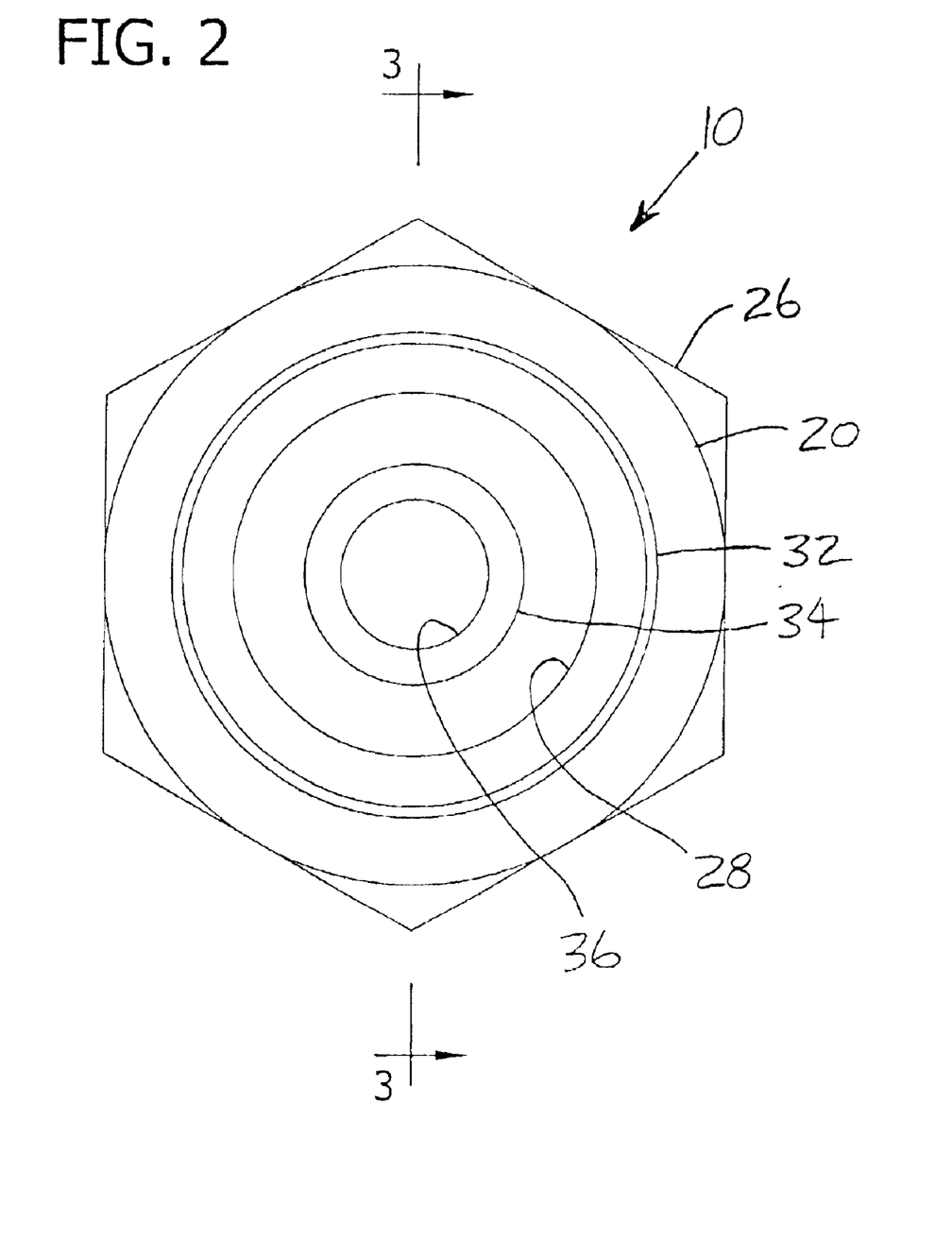
FIG. 2 is a top end view of the check valve of FIG. 1 with certain parts removed to illustrate a valve body.

The valve body 12 has upper and lower cylindric ends 20 and 22 which are externally threaded for connecting the valve 10 a compressed gas system, such as to a storage tank 24. An intermediate polygonal section 26 is suitable for engagement by a wrench. In one embodiment, section 26 is hexagonal in shape with a nominal size of 0.875 inches across external flats, but it will be understood that the section can have other shapes and sizes. The elongate body 12 (formed of brass, for example) has a passage 28 extending therethrough from a first end 30 constituting its end for entry of gas (air) under pressure to flow through to a second end 32, constituting its end for exit of the gas. Passage 28 is formed with a tapered valve seat 34 intermediate its ends, more particularly at the upper end of the intermediate section 26 (the upper end of an intermediate section 36 of the passage 28), the seat being spaced from and directed toward the exit end 32. The body 12 has an internal shoulder 38 in the passage 28 adjacent the exit end 32. Other forms of the valve body 12, including configurations assembled from two or more parts, other sizes, and valve seat arrangements do not depart from the scope of the invention. The body 12 is shown in FIG. 2 with the poppet 14, retainer 16, and spring 18 removed for illustration.

The poppet 14 is movable between a closed position (FIG. 3) in which the poppet engages the seat 34 to block flow of gas through the passage 28 and an open position (FIG. 4) in which the poppet is spaced from the seat to permit flow of gas through the valve 10. The poppet 14 is slidable in the retainer 16 and biased by the spring 18 to the closed position. When air supplied to the entry end 30 has a pressure above a predetermined value such that a force applied to the poppet 14 by the air exceeds an opposing force applied by the spring 18, the poppet disengages from the seat 34 and moves to the open position.

The poppet 14 (FIGS. 5–7) comprises a generally cylindric stem 40 configured for being slidably received in the retainer 16 and a head 42 for sealing engagement with the seat 34. The head 42 comprises, in one embodiment, a toroid shaped seal which is mounted on the stem 40. The stem 40 has two spaced flanges 44 thereon, with the head 42 being captured between the two flanges 44. The head 42 is mounted on the stem 40 with an interference fit to ensure it is tight and reliably secured. In the preferred embodiment, the head 42 has a nominal inside diameter of about 0.177 in., and the stem 40 has a diameter of about 0.193 in. Thus the head 42 must stretch to be inserted on the stem 40, and it remains tightly in position when exposed to turbulent flow of air. Other types of connections or fits between the head and stem, or one integral part, do not depart from the scope of this invention.

Figure 5:
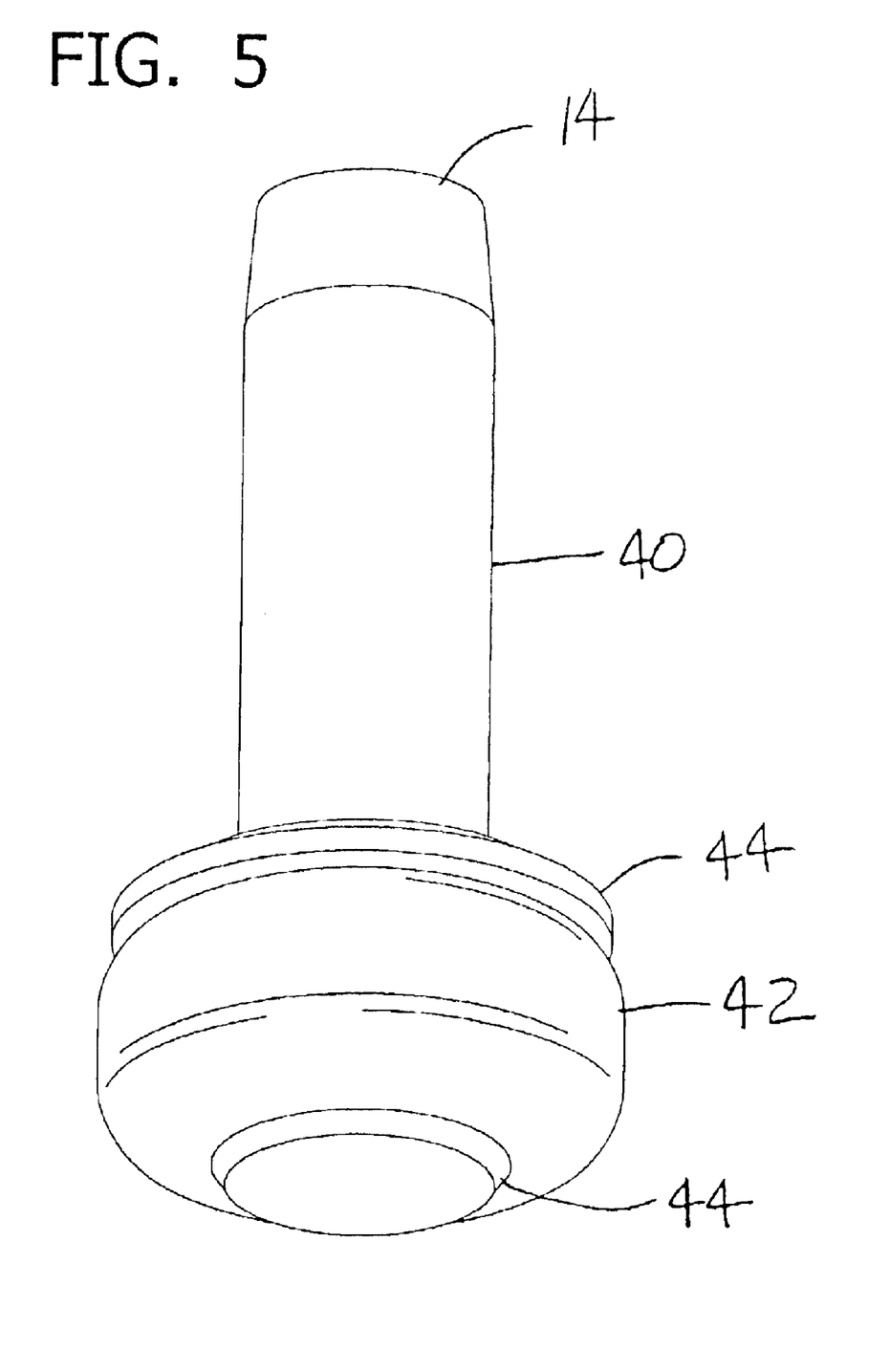
FIG. 5 is a perspective of a poppet of the check valve.
Figure 6:
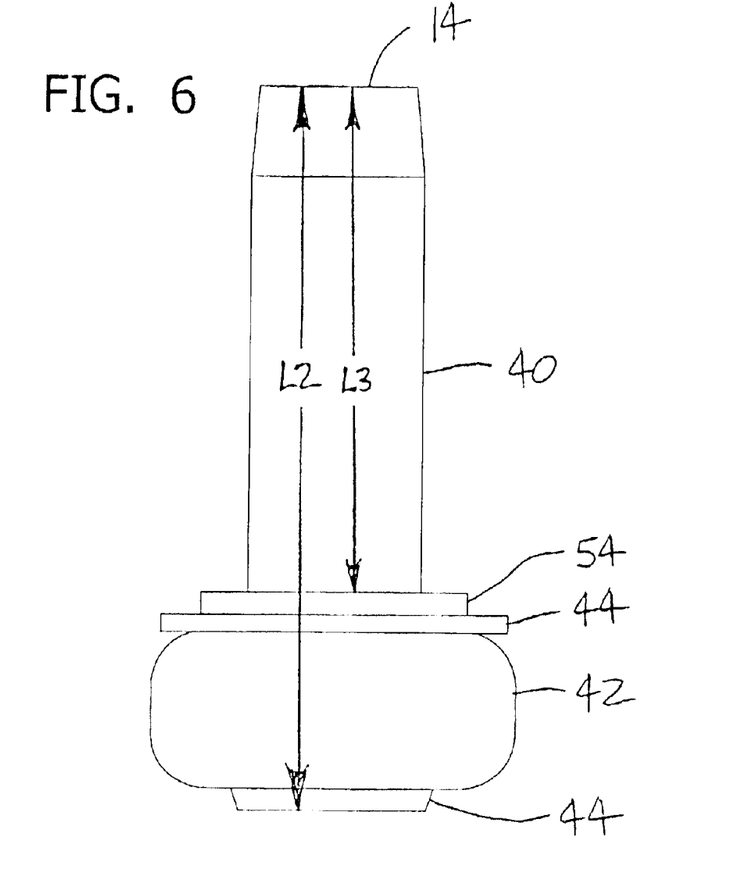
FIG. 6 is an elevation of the poppet of FIG. 5.
Figure 7:
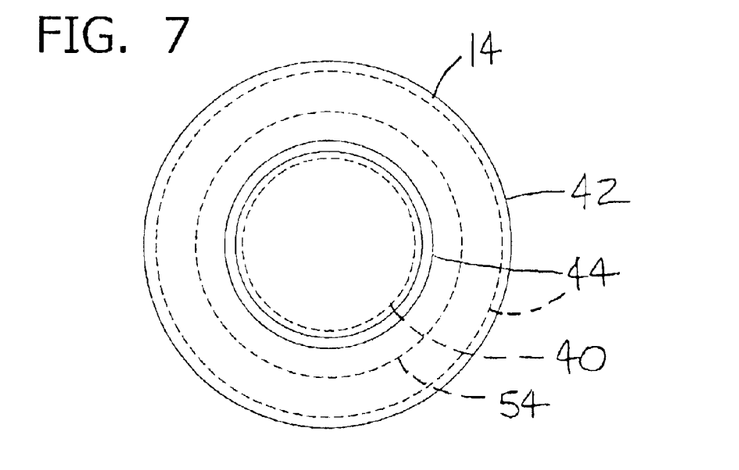
FIG. 7 is a bottom end view of the poppet of FIG. 6.

The stem 40 is formed of a suitable material which is strong, rigid, thermally stable, and resistant to corrosion and wear. In the preferred embodiment, the stem 40 is formed of a thermoplastic resin such as RYTON thermoplastic (RYTON is a federally registered trademark of the Chevron Phillips Chemical Company LP of Houston, Tex.). The head 42 is sized for mounting on the stem 40 and configured to sealingly engage the seat 34. It is formed of a suitable material which is resilient, strong, thermally stable, and resistant to corrosion and wear. In the preferred embodiment, the head 42 is formed of a synthetic rubber such as VITON fluoroelastomer (VITON is a federally registered trademark of DuPont Dow Elastomers L.L.C. of Wilmington, Del.). Other shapes and materials may be used for the stem and head without departing from the scope of this invention.

Figure 8:
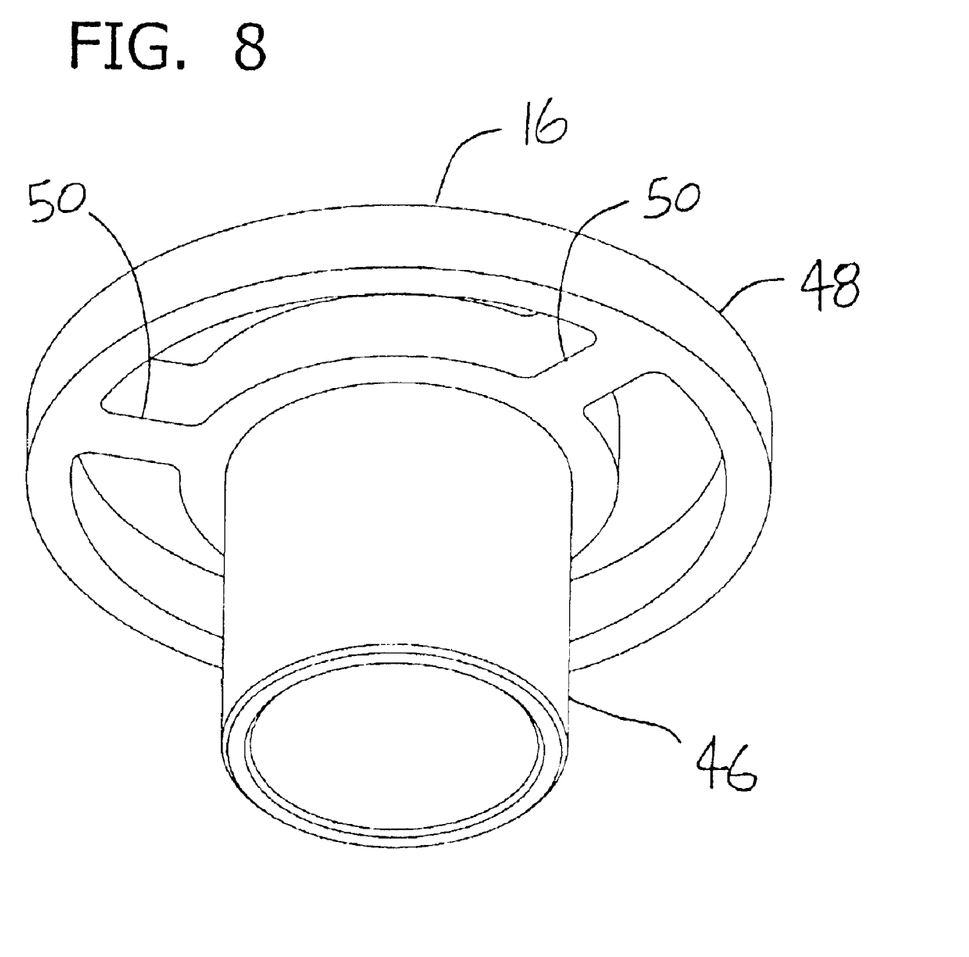
FIG. 8 is a perspective of a retainer of the check valve.

The valve retainer 16 (FIGS. 8–10) mounts the poppet 14 in the passage 28 and guides movement of the poppet between its closed and open positions, preventing any change to the orientation of the poppet which could result in failure of the valve 10. The retainer 16 comprises a substantially central sleeve 46 and an annular outer rim 48 spaced from the sleeve and sized to engage the valve body 12. The sleeve 46, which extends from the retainer 16 toward the seat 34 (FIG. 3), receives the poppet 14 and defines a linear path of movement between the closed and open positions. The sleeve 46 is mounted in alignment with the body 12 (i.e., coaxial with the passage 28) such that the path of movement of the poppet 14 is aligned with the body and generally along its center.

In order to ensure good alignment, a radial clearance between the stem 40 and an inner surface of the sleeve 46 is small. In the preferred embodiment, the clearance is in a range of 0.006 to 0.014 in., and more preferably about 0.010 in. (i.e., the stem 40 has an outer diameter of about 0.195 in. and the sleeve 46 has an inner diameter of about 0.205 in.). Further for maintaining alignment, the sleeve 46 preferably has an axial length L (FIG. 10) extending a distance greater than the outer diameter of the stem 40 (1.8 times in the preferred embodiment), and also preferably extending at least the distance traveled by the poppet 14 in moving between open and closed positions. In the preferred embodiment, the sleeve 46 has a length L (FIG. 10) of about 0.350 in.; the poppet 14 has a total length L2 (FIG. 6) of about 0.815 in.; the portion of the stem 40 downstream of the shoulder 40 slidable in the sleeve 46 has a length L3 of about 0.570 in.; and the distance traveled by the poppet 14 in moving between open and closed positions is about 0.125 in. Other dimensions and dimension ratios do not depart from the scope of this invention.

Figure 9:
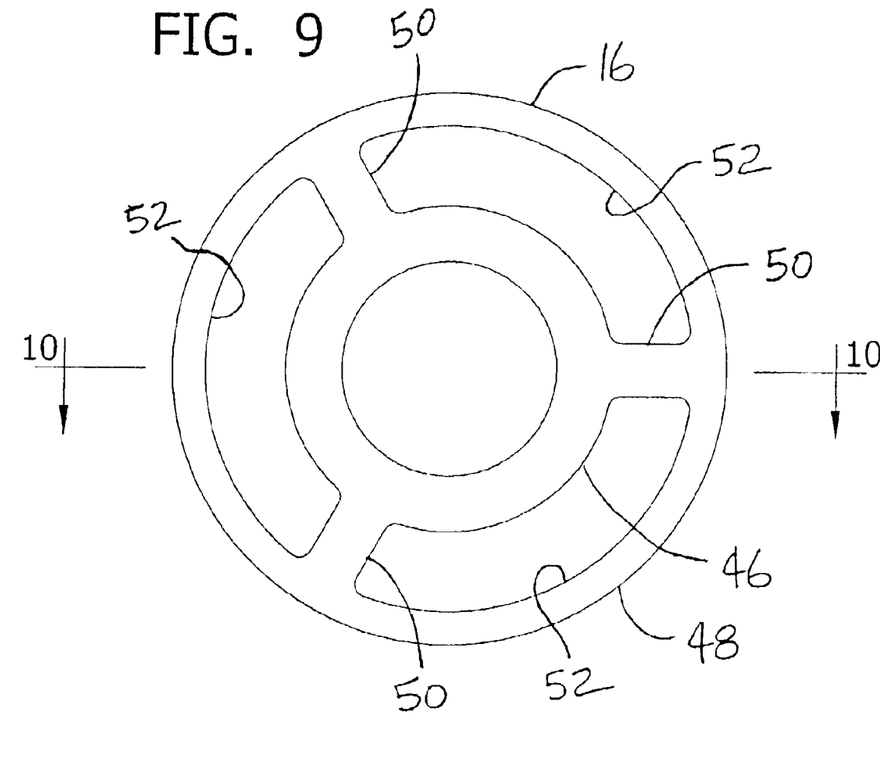
FIG. 9 is a top end view of the retainer of FIG. 8.
Figure 10:
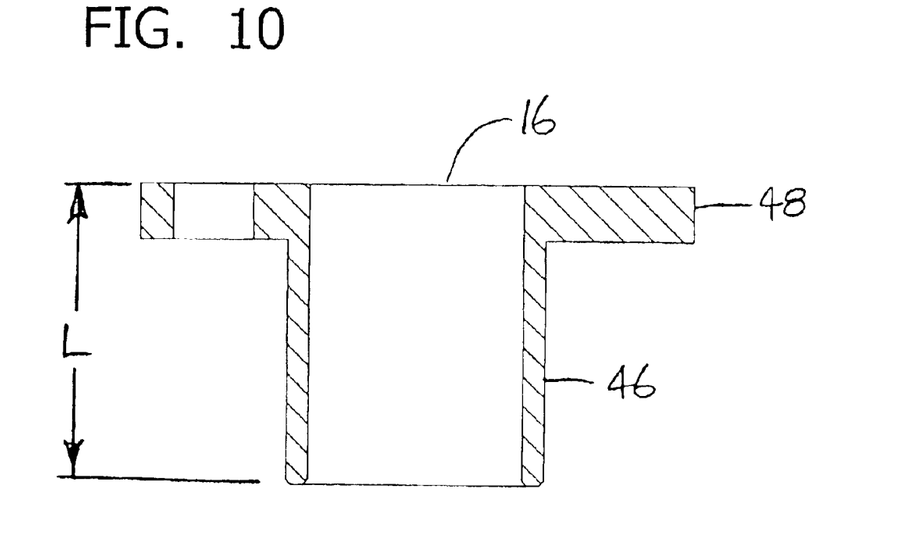
FIG. 10 is a section in the plane of line 10—10 in FIG. 9.

In the embodiment shown in FIG. 9, three circumferentially spaced arms 50 extend generally radially between the rim 48 and the sleeve 46 for supporting the sleeve in the passage 28. The arms 50 define three arcuate apertures 52 in the retainer 16 between the rim 48 and the sleeve 46, the apertures permitting exit of the flow of gas therethrough. The apertures 52 are on a circle centered in the retainer 16, the apertures being spaced at 120 degrees around the circle. The arms 50 provide adequate support to the sleeve 46 while minimizing blockage of the flow area through the apertures 52.

The retainer 16 is formed of a suitable material which is strong, rigid, thermally stable, and resistant to corrosion and wear, such as RYTON thermoplastic. Unlike some prior art poppet guides which are flexible, the rigid retainer 16 makes it particularly effective for use in a compressor discharge environment. Preferably, the sleeve 46, outer rim 48, and arms 50 are integrally formed, although it is understood that a retainer formed of several separate parts does not depart from the scope of this invention. Further, the number, size, and configuration of the arms and apertures may vary so long as the sleeve is rigidly supported and the gas is able to flow freely through the retainer.

Figure 3:
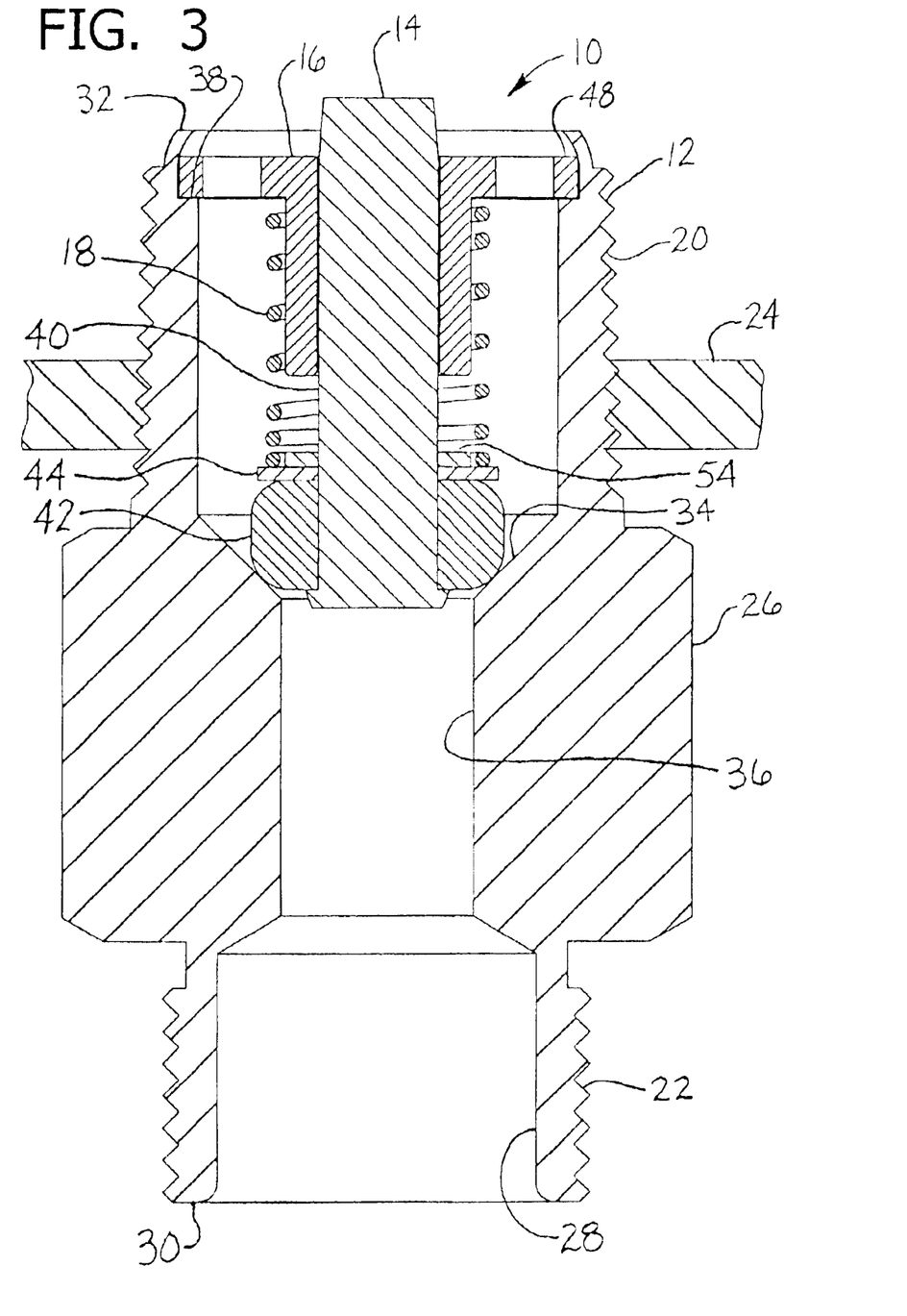
FIG. 3 is a view generally in section on line 3—3 of FIG. 2 and showing the valve at a closed position.
Figure 4:
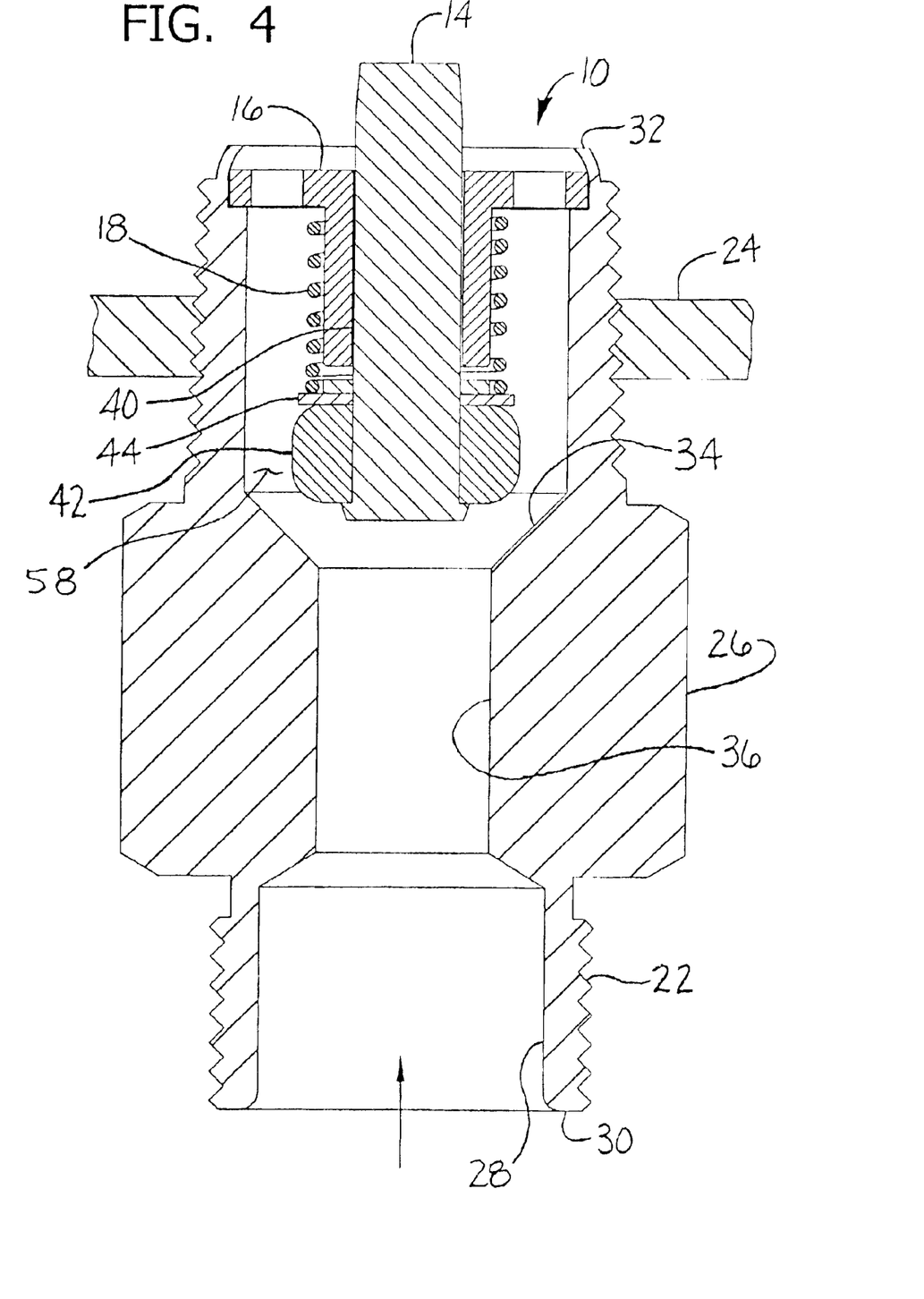
FIG. 4 is a view similar to FIG. 3 showing the valve at an open position.

As seen in FIG. 3, the retainer 16 is fixed in the passage 28, spaced downstream from the valve seat 34. The outer rim 48 is seated on the internal shoulder 38 in the passage at the exit end 32 of the passage and body and held in place by the exit end being crimped over on the retainer 16. Significantly, the position of the retainer 16 at the exit end 32 beneficially provides for straightforward assembly, good accessibility, and avoids the difficulty of trying to maneuver the retainer for attachment at a location deep inside the passage 28. Crimping provides a simple attachment and precludes fasteners or more complex retainers which are integral with the body. However, it is understood that the attachment can be done in other ways without departing from the scope of this invention.

The spring 18 (FIG. 3) comprises a helical compression spring extending between the retainer 16 and one of the flanges 44 on the poppet 14. That flange 44 has a raised shoulder 54 engageable by the spring 18 for seating the spring and preventing lateral shifting of the spring. Therefore, the spring 18 is guided and constrained from lateral shifting on both of its ends (i.e, by both the retainer 16 and the poppet 14) so that it will remain secure as the poppet moves and when exposed to turbulent flow of air. Springs 18 of varying spring constant may be selected appropriate to the expected air pressure and/or size of the valve 10 to select the predetermined value of air pressure which moves the poppet 14 from the closed to the open position. In the preferred embodiment, the spring 18 is formed of stainless steel. It is understood that other types of springs or biasing members and other materials do not depart from the scope of this invention.

Significantly, the spring 18 is configured to remain out of the path of air as it flows through the passage 28 to prevent flow turbulence, loss of air pressure, and vibratory motion of the spring. The spring 18 has turns of uniform diameter which are configured to remain generally adjacent to the retainer 16 and the poppet 14 along an entire length of the spring, such that when the poppet is at the open position, flow of air through the passage 28 is not obstructed by any part of the spring. A radial clearance between the spring 18 and sleeve 46 (and between the spring and the shoulder 54) is within a range of about 0.003 to 0.031 in., and more preferably about 0.017 in. In the preferred embodiment, the sleeve has an outside diameter of about 0.300 in. and the spring 18 has an inside diameter of about 0.317 in. Other dimensions and dimension ratios do not depart from the scope of this invention.

The passage 28 and the poppet 14 are sized for providing adequate flow areas as air passes through the valve 10 to avoid causing a decrease in either pressure or mass flow. The intermediate section 36 defines a minimum area, or "throat" of the valve 10. When the poppet 14 is open, the flow area in the passage 28 increases as the air moves from the intermediate section 36 past the conical seat 34. Preferably, the flow area downstream of the conical seat is in a range from about 125% to 225% of the flow area at the intermediate section 36, and more preferably about 175%. In the preferred embodiment, for example, the intermediate section 36 has a flow diameter of about 0.312 in., providing a cross sectional flow area of 0.076 square in. Downstream of the conical valve seat 34, the cross sectional flow area of passage 28 at location 58 (see FIG. 4) is annular in shape and is about 0.132 square in. (174% of the minimum flow area).

Figure 11:
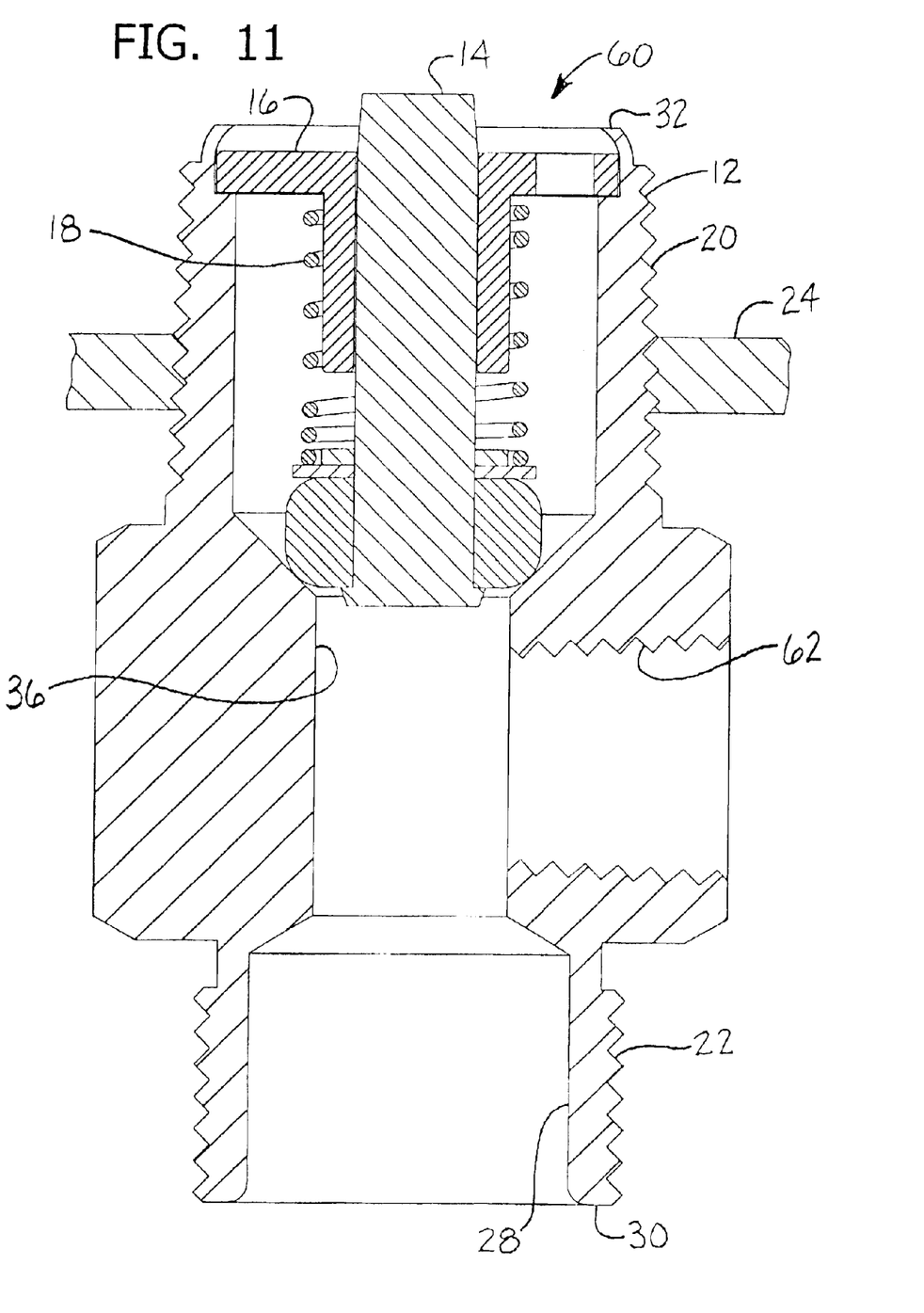
FIG. 11 is a view similar to FIG. 3 showing a modified check valve having a threaded lateral port for relieving air pressure in the valve.

Referring to FIG. 11, a modification 60 of the check valve has a conventional lateral outlet 62 from the passage 28 between the entry end 30 of the body and the valve seat 34 for relieving pressure from the passage upstream from the valve seat. As known to those skilled in the art, the outlet 62 is commonly used as a threaded "unloader port" for connection of an electrical pressure switch, for example, operable to release air trapped between the compressor and the valve, subsequent to the compressor shutting off, in order to facilitate proper re-start of the compressor.

The valve 10 of the present invention is compact in size and has a small number of component parts to minimize cost. The valve is reliable in operation in the severe environment typical for a compressor discharge. At the open position, the valve provides good internal flow characteristics with generally restriction-free flow areas, minimal turning (i.e., the flow proceeds generally straight through the valve) and with the only obstructions being the three arms 50. Therefore, the valve avoids producing a substantial decrease in pressure as air flows through the valve. Assembly of the valve 10 is facilitated by the convenient position of the retainer 16 at the exit end 32 and its attachment by crimping the end.

In view of the above, it will be seen that the several objects of the invention are achieved and other advantageous results obtained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A check valve in combination with a storage tank for holding compressed gas, the check valve comprising an elongate body having a passage extending therethrough from a first end constituting its end for entry of gas under pressure to flow through to a second end constituting its end for exit of the gas, said exit end of the body comprising a terminus of the check valve, said passage being formed with a valve seat intermediate its ends spaced from and directed toward the exit end, a retainer fixed in the passage spaced downstream from the seat apertured for the exit of the gas, said retainer having a rigid construction with a substantially central sleeve extending therefrom toward the seat, a poppet slidable in the sleeve biased for engagement with the seat for blocking flow through the passage and disengagement from the seat on pressurization above a predetermined value for flow in the space around the sleeve and through the retainer for exit from the passage, wherein the retainer is positioned adjacent the terminus at the exit end of the body to provide for accessibility in attaching the retainer in the passage, the check valve being mounted on said storage tank with its exit end projecting into an interior of the tank and free from connection to another body, such that the retainer faces the interior of the tank and gas is delivered through said apertured retainer directly into the interior of the tank.

2. A check valve as set forth in claim 1 wherein the sleeve is integral with the retainer.

3. A check valve as set forth in claim 1 wherein the retainer is seated on an internal shoulder in the passage at said exit end of the body and held in place by the exit end being crimped over on the retainer.

4. A check valve as set forth in claim 1 wherein the poppet comprises a stem received in the sleeve and a head attached to the stem and engageable with the seat.

5. A check valve as set forth in claim 4 wherein the stem of the poppet is formed of a rigid thermoplastic material and the head is formed of an elastomeric material.

6. A check valve as set forth in claim 5 wherein the retainer is formed of a rigid thermoplastic material.

7. A check valve as set forth in claim 1 wherein the body has externally threaded ends and an intermediate section configured for engagement by a wrench.

8. A check valve as set forth in claim 7 wherein the intermediate section has a hexagonal external shape.

9. A check valve as set forth in claim 1 further comprising a lateral outlet from the passage between the entry end of the body and the valve seat for relieving pressure from the passage upstream from the valve seat.

10. A check valve as set forth in claim 9 wherein the lateral outlet comprises a bleed hole for relieving pressure from the passage upstream from the valve seat.

11. A check valve for a compressed gas system, comprising:

a valve body adapted for connection to said compressed gas system, the body having opposite ends and an internal passage extending through the body between an entry at a first end of the body and an exit at a second end of the body, said passage between the entry end and the exit end defining a downstream direction for flow of gas;

a valve seat positioned between the entry and the exit;

a poppet movable between a closed position in which the poppet engages the seat to block flow of gas through the passage and an open position in which the poppet is spaced from the seat to permit flow of gas;

a retainer for mounting the poppet in the passage and for guiding movement of the poppet between the closed and open positions;

a biasing member for urging the poppet to the closed position such that the poppet is responsive to pressure of the gas exceeding a predetermined value to move the poppet away from the seat against the urging of the biasing member and to the open position;

the valve body having an internal shoulder in the passage adjacent the exit end, the retainer being seated on the internal shoulder; and a crimpable portion of the valve body comprising a peripheral edge margin of the valve body which is located at the exit end, downstream of the retainer, and which defines a terminus of the check valve;

wherein the retainer is secured in place in the valve body by said crimpable portion being crimped inward over the retainer.

12. A check valve as set forth in claim 11 wherein the retainer comprises a sleeve for receiving the poppet and defining a linear path of movement between the closed and open positions.

13. A valve as set forth in claim 12 wherein the poppet comprises a stem received in the sleeve and slidably movable therein.

14. A valve as set forth in claim 13 wherein the poppet further comprises a head attached to the stem and engageable with the seat.

15. A valve as set forth in claim 14 wherein the head comprises a toroid shaped seal.

16. A check valve as set forth in claim 12 wherein the sleeve is at a position in the passage between the valve seat and the exit.

17. A check valve as set forth in claim 12 wherein the retainer further comprises an annular outer rim spaced from the sleeve and sized to engage the valve body at said internal shoulder in the passage, and at least one arm extending generally radially between the rim and the sleeve for supporting the sleeve in the passage.

18. A check valve as set forth in claim 17 wherein the retainer has three of said arms circumferentially spaced about the rim and defining arcuate apertures in the retainer between the rim and the sleeve, the apertures permitting flow of gas therethrough.

19. A check valve as set forth in claim 17 wherein said outer rim of the retainer is positioned in the body generally adjacent the exit end.

20. A check valve as set forth in claim 11 wherein the poppet comprises a stem having two spaced flanges thereon and a toroid-shaped seal mounted on the stem and positioned between the two flanges.

21. A check valve as set forth in claim 20 wherein the biasing member comprises a helical compression spring extending between the retainer and one of said flanges.

22. A check valve as set forth in claim 21 further comprising a raised shoulder on said one of the flanges, the shoulder being engageable by the spring for seating the spring and preventing lateral shifting of the spring.

23. A check valve as set forth in claim 11 wherein the biasing member comprises a helical compression spring which extends between the retainer and the poppet.

24. A check valve as set forth in claim 23 wherein the spring has turns of uniform diameter and configured to remain generally adjacent the retainer and poppet along an entire length of the spring, such that when the poppet is at the open position, flow of gas through the passage is not obstructed by any part of the spring.

25. A check valve as set forth in claim 17 wherein said passage has an axis extending longitudinally of said body, and wherein said at least one arm of the retainer is disposed entirely within a single radial plane perpendicular to said axis.

26. A check valve as set forth in claim 1 wherein said passage has an axis extending longitudinally of said body, and wherein the retainer further comprises an outer rim and at least three circumferentially spaced arms extending between the rim and the sleeve for supporting the sleeve in the passage, the arms being disposed entirely within a single radial plane perpendicular to said axis.

27. A check valve as set forth in claim 11 wherein said crimpable portion of the valve body has a thickness which is relatively smaller than an adjacent cylindric wall of the valve body.

* * * * *